US005620647A

United States Patent [19]
Calhoun

[11] Patent Number: 5,620,647
[45] Date of Patent: Apr. 15, 1997

[54] PROCESS FOR POTTING ELECTRICAL CIRCUITS

[75] Inventor: Prentiss Calhoun, Mendinhall, Miss.

[73] Assignee: Calhoun Pitch Company, Inc., Puckett, Miss.

[21] Appl. No.: 120,022

[22] Filed: Sep. 10, 1993

[51] Int. Cl.$^6$ .............. B29C 35/08; B29C 39/10
[52] U.S. Cl. .............. 264/493; 264/272.14; 264/272.15; 264/272.17; 29/841
[58] Field of Search .............. 264/271.1, 272.11, 264/272.13, 272.14, 272.15, 272.17, 279, 279.1, 328.5, DIG. 65, 319, 297.7, 493, 492, 297.1; 29/841

[56] References Cited

U.S. PATENT DOCUMENTS

| | | | |
|---|---|---|---|
| 2,358,259 | 9/1944 | Siedschlag et al. | 264/247 |
| 3,114,807 | 12/1963 | Koda | 29/84 |
| 3,153,694 | 10/1964 | Tomlinson | 264/272.11 |
| 3,352,953 | 11/1967 | Zavitz et al. | 264/272.11 |
| 3,668,299 | 6/1972 | McNeal | 264/272.17 |
| 4,156,893 | 5/1979 | Baake | 362/222 |
| 4,243,623 | 1/1981 | Sprengling et al. | 264/272.19 |
| 4,286,302 | 8/1981 | Owens et al. | 361/15 |
| 4,729,740 | 3/1988 | Crowe et al. | 439/76 |
| 5,124,107 | 6/1992 | Schmid | 264/271.1 |

FOREIGN PATENT DOCUMENTS 857000  12/1963  Canada ............ 29/84

Primary Examiner—Angela Ortiz
Attorney, Agent, or Firm—Pravel, Hewitt, Kimball

[57] ABSTRACT

A process for potting electrical circuits with asphalt based potting compounds by providing uniform strips of solid potting compound of controlled shape and melt characteristics, which are placed in a container in a certain sequence with the circuit board. The strips, or the uppermost strip is then reflow melted by the application of Infrared Radiant heat from directly above. The melted strip flows into the can, filing all void spaces, potting the circuit.

15 Claims, 3 Drawing Sheets 5,620,647

PROCESS FOR POTTING ELECTRICAL CIRCUITS

BACKGROUND OF THE INVENTION

This application pertains to the field of potting compounds for electrical power apparatuses, especially to the field of potting compounds for electrical ballasts for fluorescent lights.

Various compounds are known for potting electrical circuits: that is, encasing an electrical circuit in a container within an impervious material to protect the circuit from the environment,and/or to improve the heat dissipation or electrical characteristics of the circuit, or, for electrical power circuits, for electrical safety.

Two major classes of compounds are commonly used. The first are the plastics, especially urethane or epoxy resins. These compounds, while effective, have low heat transfer characteristics, and are relatively expensive. The second, used in the electrical power and consumer appliance field, is a very inexpensive material, chosen for its low cost and good heat transfer and electrical properties. This potting compound comprises a mixture of asphalt, silica and, optionally, wax. The primary insulating and heat conducting compound is the silica, usually in the form of fine lean sand. Asphalt is used to provide an adhesive for the sand, and, as it melts at a relatively low temperature, to provide a liquid stage for pouring, and, upon cooling, a solid state for the potting compound. Wax modifies both the melt range of the compound and the adhesive characteristics of the asphalt, and is therefore present as a modifier for these characteristics.

Asphalt based potting compounds are applied by pouring the liquid, melted compound into a container containing the electrical circuit. The molten potting compound is usually contained in large, manually operated pouring pots, which hold the potting compound at the desired melt temperature for best pour characteristics. Such pots must usually be kept heated continuously, because the large thermal inertial of the potting compound requires too much heat to economically permit cool down and remelting for each day's work. As a result the heated pots require continuous power and monitoring for fire safety in a production environment.

Asphalt based potting compounds are designed to have a high heat conductance, for proper cooling of the encased electrical circuit. The potting compound usually has a relatively high specific heat. Electrical circuits, especially those containing heat sensitive components such as semiconductors or capacitors, have definite upper temperature limits. As an example, modern electrical fluorescent ballasts have components with an upper temperature range of 290 degrees F. There is therefore at all times a narrow temperature range at which the potting compound must be held to keep it liquid, and yet not overheat the electrical circuit when the compound is applied.

The current heat pot method of potting compound application therefore has several significant disadvantages. The pots must be kept continuously at full melt temperature, posing a continual explosion or fire hazard. The pots are expensive, it is estimated that a single production line requires 120,000 dollars solely for the heat pots. Finally, and of equal importance, the process requires manual judgement as to the amount of potting compound poured into each container which produces relatively uneven results and quality.

SUMMARY OF THE INVENTION

The invention is a process for applying an asphalt based potting compound to an electrical circuit which eliminates the present manual pots, permits a far more precise control of the amount and the temperature of potting compound applied to the electrical circuit, and reduces the risk of over-temperature damage to the potted electrical circuit.

Typically, a potted electronic ballast is a single rectangular printed circuit board, placed in a metal rectangular can (4), closed except at the top. The potting compound must encase the circuit board, and its components, within the can (4), filling all air spaces within the can (4). The potted circuit should therefore present a uniformly filled appearance, of a can (4) filled with a black smooth material.

The inventive process pots the circuits by providing uniform strips of solid potting compound, of controlled shape and melt characteristics, which are placed in the can (4) in a certain sequence with the circuit board, and which are then reflow melted by the application of Infrared Radiant heat from directly above.

Two distinct strips are provided. An underpour strip is inserted in the can (4), shaped to fill the bottom of the can (4) below the circuit board to the edges of the can (4). The circuit board is placed on the underpour strip. An overpour strip is than placed above the circuit board. The overpour strip is as long as the circuit board, but is narrower than the can (4). The filled can (4) is placed on a continuous belt and passes under a bank of direct radiant heat sources, preferably InfraRed (IR) heat lamps of controlled radiant power.

The strips comprise selected asphalt-silica-wax compounds. Since the strips are precut and precast to specific shapes, to match a specific electrical circuit and can (4) for potting, both the mass of the compound in each strip, and the strip's thermal characteristics may be exactly controlled. The temperature at which a strip melts may be controlled by the asphalt used. Further, asphalt melt points may be modified by oxidizing the asphalt, a known process, and by varying the proportions of asphalt, sand, and wax content. The rate at which the strip melts under the IR light is then a function of the specific heat of the strip, the melting point of the strip, the power of the IR source, and time of exposure.

Since the only heat source is from vertically above the covered or shielded (whether directly by the strip or by the tray or bracket holding the strip) electrical circuit can (4), all heat is applied to the top surface of the overpour strip, which thus melts from its top surface down. The conveyor speed is set for a desired production rate. The heat output of the IR lamps is easily controlled by varying the voltage applied to the IR lamps. This voltage control fine tunes the process rate so that the overpour strip melts completely just as the can (4) passes voltage from under the last IR heat source.

During the entire process, the overpour strip and a perforated tray or strip carrier holding the strip receives all the direct radiant heating. The strip carrier shadows and protects the electrical circuit from over-temperature. The melt point for the overpour strip is chosen to be below the maximum permissible temperature of the circuit components, and thus the overpour strip both pots the circuit board and protects the circuit board from over-temperature during the potting process.

The underpour strip is usually designed to have better adhesion. Heat conduction through the circuit board, from the melted overpour potting compound will soften or melt the underpour strip. The circuit board will settle into the underpour strip, which will then extrude sufficiently around the edges of the circuit board to pot the board on its underside and edges.

An additional advantage to the process is that the overpour strip can be made of various layers from its upper surface to the bottom. Since the strip melts from the top down, this permits the final potting compound to have varying characteristics at various levels within the circuit board can (4). For example, the upper surface of the overpour strip may be made having a higher percentage of wax; the resulting potting compound will have higher wax content at the surface of the circuit board, where the additional wax reduces adhesion of potting compound to component wiring next to the circuit board where the wiring is soldered. This reduced adhesion reduces thermally induced mechanical stresses on the soldered joints as the potted circuit warms up or cools down during use, and thus reduces electrical circuit failures.

The increased wax level, however, lowers the thermal conductance of the potting compound below desirable levels. The next lower layer within the overpour strip is then of reduced wax content, so that the potting compound has a higher thermal conductance. Top down melting of these layers sequentially reflows the desired potting compound composition onto the circuit board, permitting the circuit to be potted in a can, with varying potting compound characteristics, as desired, vertically throughout the potted circuit. Thus a higher heat conductance is formed around the electrical component bodies, especially the heat producing surfaces which are generally spaced a distance above the circuit board.

The process is providing distinct underpour potting compound strips and overpour potting compound strips, placing the circuit board between the strips in a can and reflow melting the strips controllably into the circuit containing can by direct radiant heat. The process may be exactly controlled by varying heat exposure by varying the voltage applied to the radiant heat sources during the heating cycle further, the strips may be made with layers of different characteristics, which will melt and deposit as layers of differing characteristics within the electrical potting. This capability has not previously existed in the art.

It is therefore an object of the invention to disclose a process for potting electrical circuits which provides a uniform application of potting compound to each circuit potted.

It is a further object of the invention to disclose a process for potting electrical circuits which protects the circuit against the excessive application of heat.

It is a further purpose of the invention to disclose a process for potting electrical circuits which has a significantly reduced power consumption over the prior art.

It is a further object of the invention to disclose a process for potting an electrical circuit which produces a potting having reduced susceptibility to stress cracking of electrical joints at the circuit board, but which retains maximal thermal conductance and insulating anti-vibration properties around the high heat generating components in the circuit.

It is a further object of the invention to disclose a process for potting an electrical circuit which is capable of producing layers having desired differing thermal or mechanical properties across the circuit being potted.

DETAILED DESCRIPTION OF THE INVENTION

Figure 1:
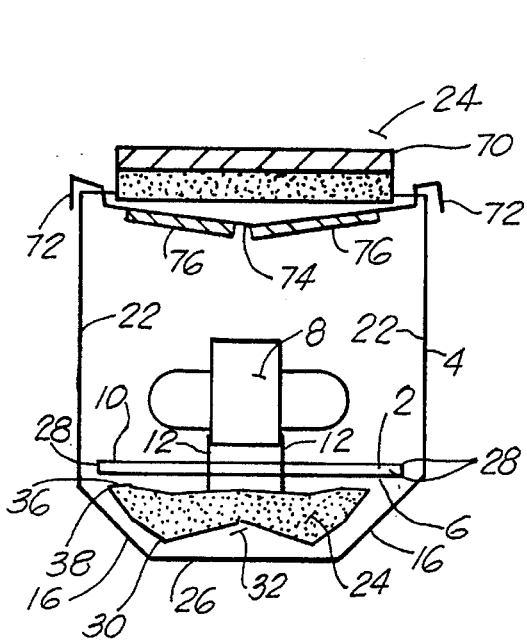
FIG. 1 is a section view of the circuit board in a can assembled with the potting compound strips for use in the inventive process. The underpour strip is not to scale, for clarity of view of the other components.
Figure 2:
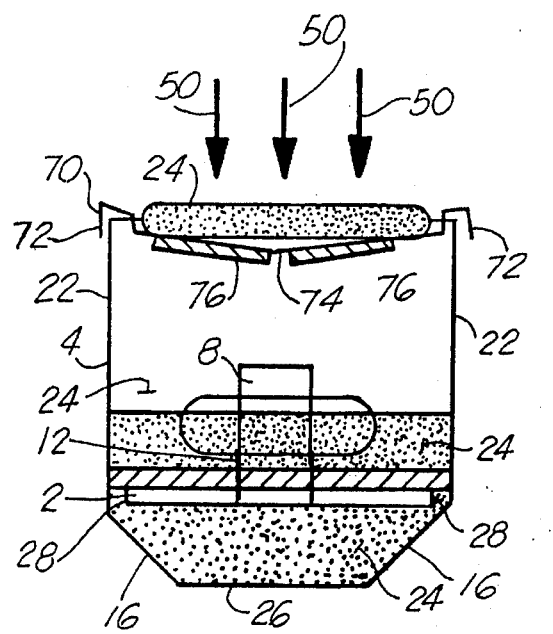
FIG. 2 is a view of the two part overpour strip in the process of reflow melting to pot the circuit board, the underpour strip having melted.
Figure 3:
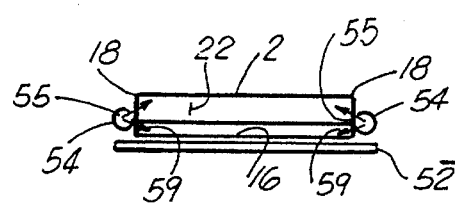
FIG. 3 is a view down the line of the moving belt of the process showing the use of air blown through the side rails to cool the ends of the cans.
Figure 4:
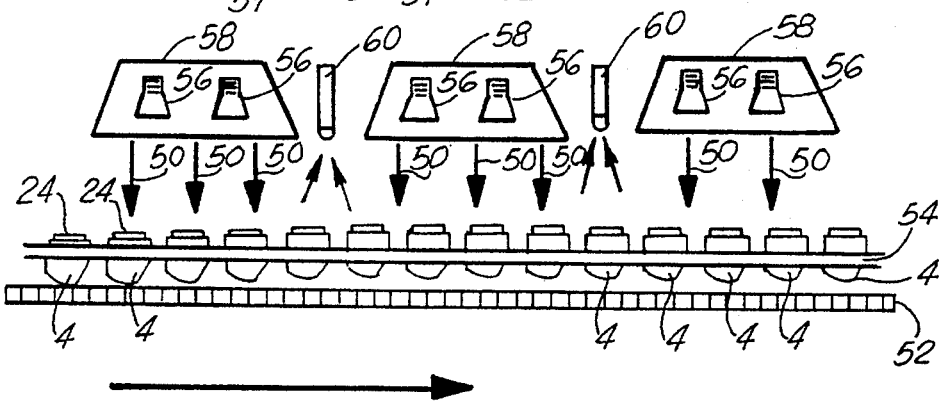
FIG. 4 is a side view of multiple cans being passed by the belt under the IR lamps in the process.
Figure 5:
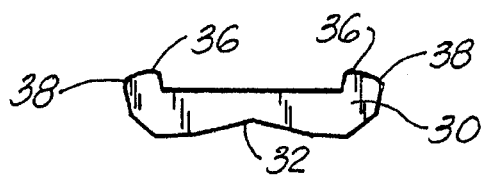
FIG. 5 is an end view of the underpour strip.
Figure 6:
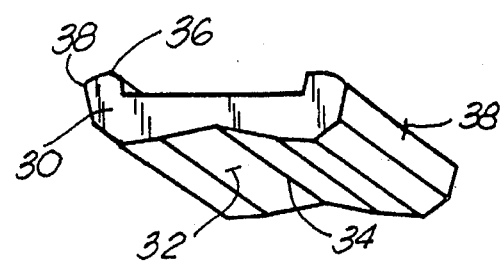
FIG. 6 is an angled view of the underpour strip.
Figure 7:
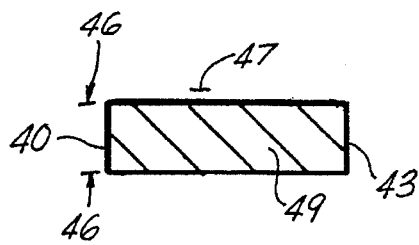
FIG. 7 is an end view of one embodiment of the overpour strip.
Figure 8:
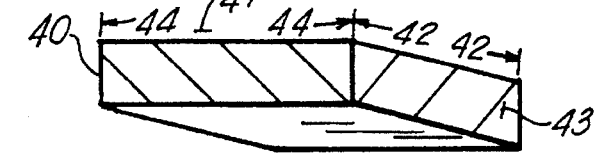
FIG. 8 is an angled view of one embodiment of the overpour strip.
Figure 9:
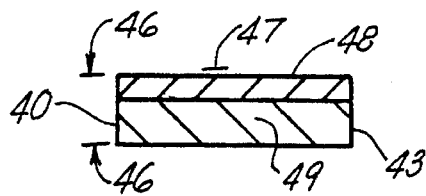
FIG. 9 is an end view of a second embodiment of the overpour strip.
Figure 9A:
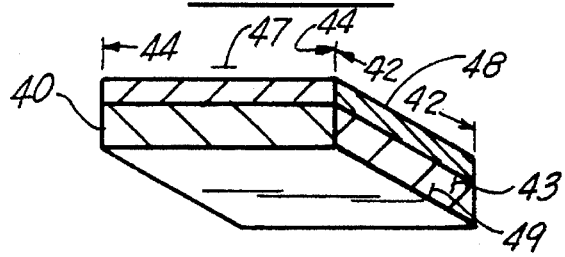
FIG. 9A is an angled view of a second embodiment of the overpour strip.
Figure 10:
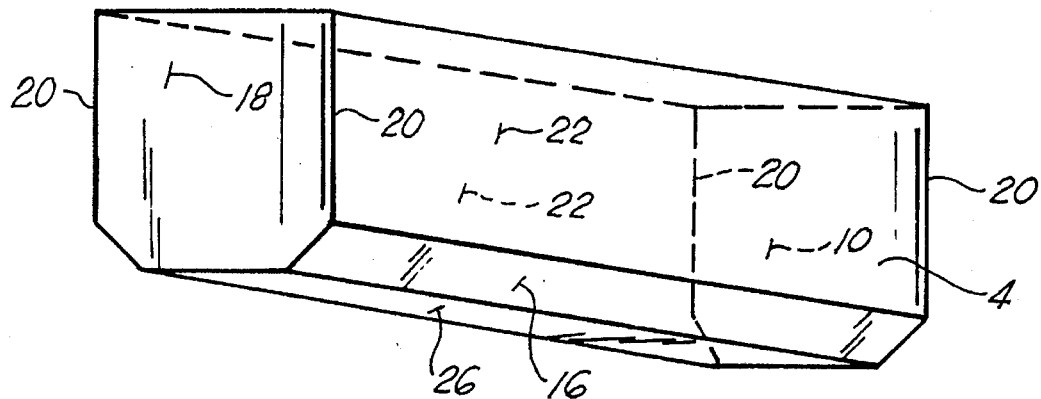
FIG. 10 is an angled view of the can into which the circuit is potted in the illustrative embodiment of the inventive process.
Figure 11:
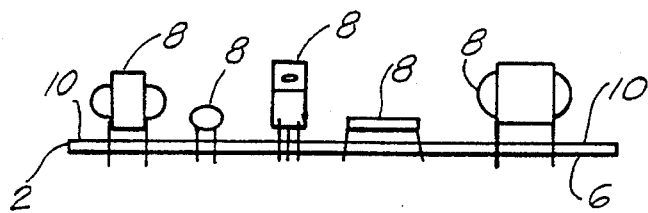
FIG. 11 is a view of an example circuit board.
Figure 12:
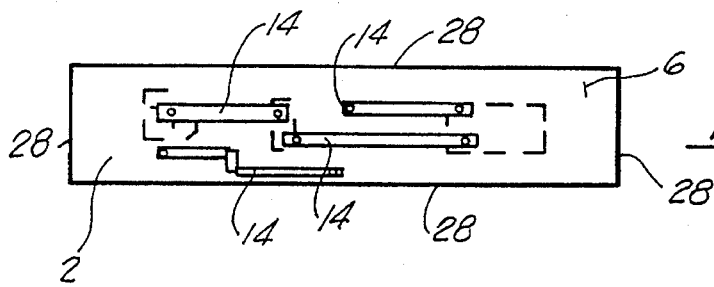
FIG. 12 is a bottom view of the example circuit board.
Figure 13:
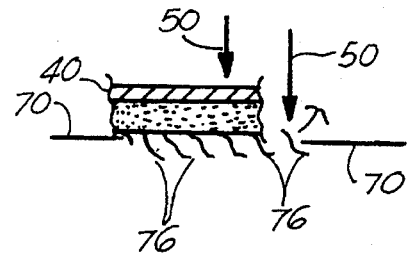
FIG. 13 is a cross section view illustrating the remelt of the overpour strip.
Figure 13:
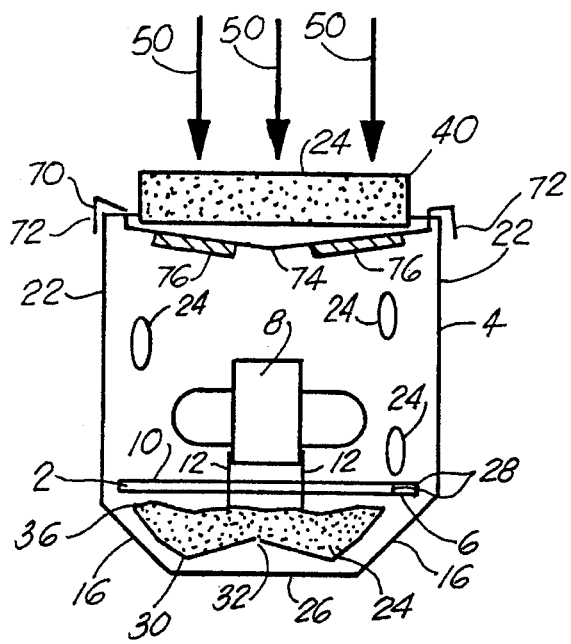
Figure 14:
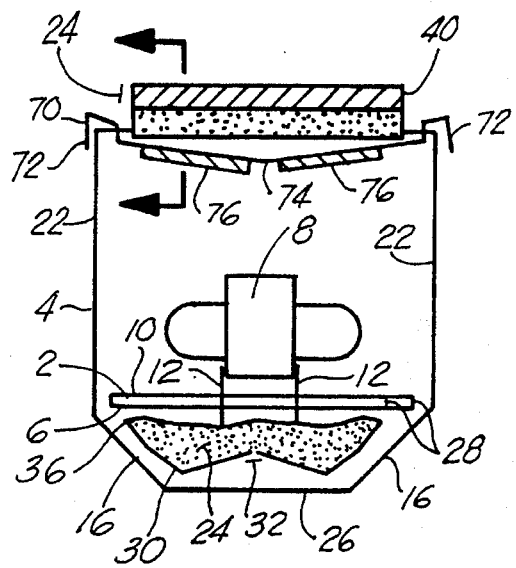
FIG. 14 is a view of an assembled circuit board in a can with a two part overpour strip for remelt in the process of the invention.

The process of the invention is best understood in relation to the exact electrical circuit (2) to be potted and the container (4) into which this circuit is to be potted. For the preferred embodiment, the process described is for potting electronic ballasts (2) for fluorescent lamps, and this specific container (4) and circuit board (2) will be described to illustrate the process.

The exemplar ballast (2) is a rectangular printed circuit board, plated on one side (6), (the bottom) and with all components (8) mounted on the other side (10) (the top). Each component (8) is mounted by passing its metal leads (12) through holes in the circuit board (2) and soldering these leads to the metal interconnections (14) on the circuit board (2). The resulting circuit board (2) therefore has, mounted above its top (10), various components (8) such as transformers, semi-conductors, capacitors; and the like.

This circuit board (2) is placed in a rectangular can or box (4), formed of folded sheet metal. Typically, the can has slightly curved bottom corners (16), formed by truncating or angling. The ends (18) of the can (4) are merely folded up, and the edge (20) between the ends (18) and the sides (22) of the can (4) are not necessarily sealed. The can (4) is usually painted black.

Potting of the circuit (2) in the can (4) requires that all surfaces (6, 10) of the circuit board (2) are coated with potting compound (24) as the circuit board (2) is seated in the can. The potting compound (24) is also used to secure the circuit board (2) in the can (4). The curved or angled bottom can (4) corners (16) serve to space the circuit board above the bottom (26) of the can (4) to prevent electrical shorts or flash over between the metal interconnection (14) and the can (4). It is therefore necessary that the potting compound (24) fill the can (4) below the circuit board (2), adhering to both can (4) and board (2). The compound (24) then should flow between the edges (28) of the circuit board and the can (4) side and end walls, and fill the can (4), encasing the circuit board (2), and leaving no voids.

The potting compound (24) is a mixture of asphalt and silica, with certain optional additives such as wax to modify the mechanical or thermal properties of the potting compound. The melting point of the compound (24) is determined primarily by the melting point of the Asphalt, although wax can somewhat affect the melting temperature of the compound (24). The thermal conductivity of the thermal compound (24) is primarily determined by the percentage of silica, usually in the form of clean sand, present in the compound. Increased sand increases the thermal conductivity of the mixture, and therefore increases the permissible power dissipation of the circuit board (2). Since the circuit board (2) is encased in the potting compound (24), the maximum electrical power limits of the circuit (2) will depend on the thermal conductivity of the potting compound (24).

A preferred compound has 60–65 percent silica for proper heat transfer, and 35–40 percent asphalt. The asphalt is selected for a 280 degree F flow point, or may be modified to such a flow point by selective oxidation of the asphalt or varying the ratios of composition. A second mixture is 50–55 percent silica, 40–45 percent asphalt, and 2–10 percent wax. The asphalt in this mixture has a lessened adhesion, and the mixture softens to a plastic state at about 200 degrees F. As above stated, wax may be added to the above mixtures for better flow rates of the melted potting mixture, typically this is a high melting point synthetic wax, having a 280 degree F. melt point.

In the inventive process an underpour strip (30) is formed to fit within the bottom (26) of the can (4) beneath the circuit board (2). Preferably the underpour strip (30) is slightly concave (32) along its lengthwise axis (34) and has lengthwise border ridges (36) along its sides (38) to provide extra compound along the edges (28) of the circuit board (2). The underpour strip (30) is formed to contain a fixed quantity of potting compound, based on the volume of the can (4) underneath the circuit board (2) when potted. The volume of the underpour strip (30) is easily controlled by varying the depth of the lengthwise concavity (32). The underpour strip (30) is preferably made of the 230–260 degree F. softening point compound (24), although it can be formed of the 280 degree F. flow point compound (24) if greater heat conductance is required under the circuit board (2).

The overpour strip (40) is usually formed of a single thick strip, which is as long (42) as the circuit board (2), but which is slightly narrower (44) than the board (2). The overpour strip (40) is sufficiently wide (44) however, to cover the components (8) on the board (2), shadowing them from direct radiant heat (50) from above. The thickness (46) of the overpour strip (40) is chosen so that the strip (40) contains sufficient potting compound (24) to fill the can above the circuit board (2), encasing the circuit board (2) and the components (8).

For ease in positioning the overpour strip (40), a covered strip carrier (70) is provided. Strip Carrier (70) has side lips (72) which fit over the sides (22) of the can (4). The center (74) of carrier (70) is depressed or concave. Lowered openings (76) permit free flow of remelted potting compound (24) into the can (4) while further shielding the circuit components (8) from radiant heat (50).

A preferred overpour strip (40) is formed as a unitary strip, but having a higher wax content in a top layer (48) of the strip. Such a strip may be formed by sequential casting of two mixtures, but is more easily formed by casting a single strip (40), then casting a layer of wax on top of the strip (40), and then mechanically mixing the wax layer into the top of the potting compound (24) as the strip cools.

In the process, a sequence of cans (4) are filled and potted as follows. The cans (4) are aligned transversely (side to side) along a moving belt (52), the cans (4) are retained in alignment on the belt (52) between two side retainer rails (54). In sequence, an underpour strip (30) is placed in the can (4), a circuit board (2) is placed on the underpour strip (30), component (8) side up, a strip carrier (70) is placed over the can (4), and then an overpour strip (40) is placed on the strip carrier (70) over the components (8). The depressed center (74) of the strip carrier (70) centers the overpour strip (40) over the can (4) so that even remelt flow occurs on both sides of the strip (40). The cans (4) then travel on the belt (52), under a direct radiant heat (50) source. A suitable such source (50) comprises a bank of three Infrared (IR) heat lamps (56) such as Sylva-Therm heat lamps by GTE. These lamps (56) have individually an up to one kilowatt radiant power, and may be assembled into infrared ovens (58) by mounting a battery of such lamps (56) within a holder, to be suspended over the moving cans (4) just above the height of the ballast (4) and overpour strip (40). A bank of three sequential such IR ovens (58), totaling 16 kilowatts power, has proven satisfactory. Individual infrared pyrometers (60) may be periodically placed between banks of IR lamps (56) to monitor the moving ballasts to detect dangerous overtemperature.

The direct IR radiant heat (50) is significantly above the maximum permissible temperature of the components (8) on the circuit board (2). However, as the belt (52) moves the assembled ballasts (4) below the lamps (56), the strip carrier (70) covers and shadows the components from direct IR exposure. The angled opening of the Louvered openings (76) permit free flow of melted potting compound (24), but shade against direct IR radiation (50). The Overpour strip (40) melts under the direct IR heat (50). Starting with the top surface (47) of the overpour strip (40), the melted potting compound (24) flows down the sides (43) of the strip (42) through the ballast cans (4), filling the space above the circuit board (2). The temperature of the melted potting compound (24) is the melt point of the overpour strip (40), which is therefore controlled to be below the maximum temperature of the components (8) on the circuit board (2); in the example given, this is 280 degree F. flow point, for components (8) having a 290 degree F. maximum temperature.

The speed with which the overpour strip (40) melts is a function of four factors: the thermal reflectance of the strip (40); the specific heat of the strip (40); the radiant heat power of the IR lamps (56), and the time of exposure of the strip (40) to the lamps (56). All the potting compounds (24) discussed here are a dull black and have a uniform reflectance; any talc coating, which may be present in shipment to protect individual strips in shipment, melts off at the start and has no significant effect on the melting rate of the strips (40). The mass of the strip (40) to be melted is determined by the amount of compound needed to fill the ballast can (4) and the potting compounds' (24) percentage of silica, chosen for a desired heat conductivity for the potted ballast. The speed of the belts (52), and thus the time of heat exposure, is fixed to achieve a desired production rate. The radiant heat of the IR lamps is fixed by their design. Therefore it is considered best to control the temperature of exposure to achieve a desired melt rate, by varying the voltage applied to the IR lamps (56) and thus vary the radiant heat (50) emitted by the IR lamp (56) so that the overpour strip (40)

has completely melted just as the ballast can (4) emerges from the last IR lamp.

The underpour strip (30) is preferably of a low softening point potting compound (24) as discussed above. Where the underpour strip (30) has a 230–260 degree F. softening point, conducted heat from the melted overpour strip potting compound (24), through the circuit board (2), is sufficient to melt or soften the underpour strip (30), and the circuit board (2) sinks into the underpour strip (30), sealing and potting the circuit board (2) from underneath. The underpour strip border ridge (31) extrudes up around the edges (28) of the circuit board, encasing the board (2) from contact with the can (4) walls.

Where a higher heat conductance is required from the underpour strip (30) than is available from a low melt point potting compound (24), the process is modified by first placing the underpour strip (30) in the can (4) and then passing the can (4) and strip (30) under a single IR heat lamp oven (56); where the radiant heat (50) softens the strip (30). The circuit board (2) and overpour strip (40) are then placed as before and the circuit board (2) sinks into the softened underpour strip (30). The remainder of the process is the same.

A significant advantage of the inventive process over the prior art is that, since the overpour strip (40) melts from the top down, it can be formed of layers of varying consistency to provide a multi-layer potting compound (24) around the circuit (2). For example, in the prior art, circuit failures caused by thermal expansion stress on the component leads (12) is a recurring problem. An asphalt based potting compound (24) having sufficient thermal conductivity for the circuit components (8) has a high tack or adhesion. It adheres tightly to the component leads (12) at the point where they are soldered to the circuit board (2), and can stress the leads (12) to cause solder fractures. An asphalt compound (24) having lessened adhesion, due to the addition of wax, has insufficient thermal conductance to dissipate heat from the components (8). The multiple layer strip (40) made possible by the inventive process permits a high wax content potting compound (24) to be melted and flow onto the circuit board (2) around the lower component leads (12), thus reducing adhesion and thermal stress transfer to the leads (12); a second layer (42) of high silica, high heat conductance compound (24) then melts and pools around the components (8), potting them in a desirable thermal environment.

It is typical for electrical ballasts that the can (4) is formed from folded sheet metal. The ends (18) of the can (4) are therefore folded up but the seams (20) between the ends (18) and the sides (22) are not sealed. This can result in liquid ballast compound (24) leaking between the can (4) ends (18) at these seams (20). This tendency is exacerbated in the inventive process because ballast cans (4) are painted black to enhance heat dissipation, and thus the cans (4) adsorb heat from the IR lamps (56). It is beneficial therefore to provide a supply of cooling air along or through the side guide rails (54), against which the can ends (18) slide as the ballasts (4) are moved through the IR heat ovens (58) on the belt (52). In a simple form, the side rails (54) may be formed of pipes, with small air holes (55) periodically placed, such as at two inch intervals. Cooling air (59) blows from these holes (55) onto the ends (18) of the ballast cans (4), keeping these ends (18) below the melt temperature of the potting compound (24), and effectively sealing the end seams against leakage of potting compound (24).

The critical improvement in the process is that the energy consumption of the potting process is significantly improved by the elimination of preheated potting compound pots, with the consequent elimination of the safety and fire hazards posed by the continual presence of large quantities of molten asphalt based compounds in the factory line. Further, the use of precast strips of potting compound permits exact, repeatable control of the volume and characteristics of the potting compound, and exact, repeatable application of a specific quantity of potting compound to each circuit and can (4).

The process has been illustrated by the example of use for potting a fluorescent ballast into a can. It should be apparent that the process extends to all forms of construction where electrical circuits are potted using asphalt based potting compounds, which are widely used in the electrical power industry. The invention thus extends to the wide range of equivalent applications as would be apparent to a skilled worker in the electrical assembly industry.

I claim:

1. A process for potting an electrical circuit within a container comprising the following steps:
    a) providing an underpour strip of precast, meltable potting compound;
    b) providing an overpour strip of precast, meltable potting compound;
    c) placing said underpour strip into said container;
    d) placing said electrical circuit onto said under pour strip within said container;
    e) placing said overpour strip onto said electrical circuit in said container; and
    f) applying direct radiant heat to the top of said overpour strip until said strip is melted upon said electrical circuit.

2. The process of claim 1 the step of placing the overpour strip further comprising:
    placing said overpour strip on a louvered strip carrier;
    placing said strip carrier on the container, thereby centering the overpour strip above and over the container.

3. The process of claim 1, the step of providing the overpour strip further comprising:
    forming said overpour strip of a plurality o sequential layers of potting compound, each layer having differing physical characteristics;
    said overpour strip melting from the direct radiant heat from the top down, thereby flowing potting compound in layers onto the circuit, and thus forming potting layers corresponding to the layers in the overpour strip.

4. The process of claim 3, said overpour strip layers having a top layer having reduced adhesion, and a bottom layer having increased thermal conductance, the process comprising:
    potting said circuit with said potting compound having reduced adhesion around component leads, thereby reducing stress cracking of solder joints; and
    having increased thermal conductance around component bodies, thereby increasing heat dissipation of the potted circuit.

5. The process of claim 3, said overpour strip being provided with a top layer having increased wax content and a bottom layer having increased silica content, the process further comprising:
    potting said circuit with said potting compound having reduced adhesion, due to wax content, around component leads, thereby reducing stress cracking of solder joints; and having increased thermal conductance, due to increased silica content, around component bodies, thereby increasing heat dissipation of the potted circuit.

6. The process of claim 2, the step of providing the overpour strip further comprising:

forming said overpour strip of plurality of sequential layers of potting compound, each layer having differing physical characteristics;

said overpour strip melting from the direct radiant heat from the top down, thereby flowing potting compound in layers onto the circuit, and thus forming potting layers corresponding to the layers in the overpour strip.

7. The process of claim 6, said overpour strip layers having a top layer having reduced adhesion, and a bottom layer having increased thermal conductance, the process comprising:

potting said circuit with said potting compound having reduced adhesion around component leads, thereby reducing stress cracking of solder joints; and having increased thermal conductance around component bodies, thereby increasing heat dissipation of the potted circuit.

8. The process of claim 6, said overpour strip being provided with a top layer having increased wax content and a bottom layer having increased silica content, the process further comprising:

potting said circuit with said potting compound having reduced adhesion, due to wax content, around component leads, thereby reducing stress cracking of solder joints; and having increased thermal conductance, due to increased silica content, around component bodies, thereby increasing heat dissipation of the potted circuit.

9. The process of claim 1 further comprising:

controlling the rate of melting of said overpour strip by varying the amount of said direct radiant heat.

10. A process for potting an electrical circuit within a container comprising:

providing an overpour strip of precast, meltable potting compound;

placing, in sequence, within the container,
said underpour strip;
the electrical circuit;

placing said overpour strip on a louvered strip carrier;

placing said strip carrier on the container, centering thereby said strip over the container;

forming thereby a can assembly;

placing a sequence of said can assemblies on a moving belt;

moving, on said belt, said can assemblies past and under one or more radiant IR heat ovens, thereby:
melting said overpour strip from the top down;
filling the container from the top of the circuit board with melted potting compound;
shielding said circuit board from direct radiant heat by shadowing from said louvered strip carrier;
conductively heating, from the heat of the melted overpour strip, said underpour strip until said underpour strip softens,
thereby setting said circuit board into said underpour strip, thereby potting said circuit board in said container.

11. The process of claim 10, the step of providing the overpour strip further comprising:

forming said overpour strip of a plurality of sequential layers of potting compound, each layer having differing physical characteristics;

said overpour strip melting from the direct radiant heat from the top down, thereby flowing potting compound in layers onto the circuit, and thus forming potting layers corresponding to the layers in the overpour strip.

12. The process of claim 11, said overpour strip layers having a top layer having reduced adhesion, and a bottom layer having increased thermal conductance, the process comprising:

potting said circuit with said potting compound having reduced adhesion around component leads, thereby reducing stress cracking of solder joints; and having increased thermal conductance around component bodies, thereby increasing heat dissipation of the potted circuit.

13. The process of claim 10, said overpour strip being provided with a top layer having increased wax content and a bottom layer having increased silica content, the process further comprising:

potting said circuit with said potting compound having reduced adhesion, due to wax content, around component leads, thereby reducing stress cracking of solder joints; and having increased thermal conductance, due to increased silica content, around component bodies, thereby increasing heat dissipation of the potted circuit.

14. A process for potting an electrical circuit within a container comprising the following steps:

a) providing an underpour strip of precast, meltable potting compound;

b) providing an overpour strip of precast, meltable potting compound;

c) placing said underpour strip into said container;

d) applying direct radiant heat to said underpour strip until said strip is melted;

e) placing an electrical circuit onto said melted underpour strip within said container;

f) placing said overpour strip onto said electrical circuit in said container; and g) applying direct radiant heat to the top of said overpour strip until said strip is melted upon said electrical circuit.

15. A process for potting an electrical circuit within a container comprising:

providing an underpour strip of precast, meltable potting compound;

providing an overpour strip of precast, meltable potting compound;

in sequence, first placing within the container said underpour strip;

placing a sequence of said containers with said underpour strips on a moving belt;

moving, on said belt, said containers past and under one or more radiant IR heat ovens, thereby:
melting said underpour strip;
next placing within the container, on top of said melted underpour strip, an electrical circuit;
then placing said overpour strip on a louvered strip carrier, and placing said strip carrier on the container, centering thereby said strip over the container;
forming thereby a can assembly;
placing a sequence of said can assemblies on a moving belt;
moving, on said belt, said can assemblies past and under one or more radiant IR heat ovens, thereby:
melting said overpour strip from the top down,
filling the container from the top of the circuit board with melted potting compound,
thereby potting said circuit board in said container while shielding the circuit board from direct radiant heat by shadowing from said louvered strip carrier.

* * * * *